(12) United States Patent
Sugimoto et al.

(10) Patent No.: US 7,382,496 B2
(45) Date of Patent: Jun. 3, 2008

(54) IMAGE FORMING APPARATUS

(75) Inventors: Yukihiko Sugimoto, Kashihara (JP); Ryuichi Nakashima, Hirakata (JP); Hiroshi Kubota, Nara (JP); Yasuo Yoshioka, Nara (JP); Katsuhiko Kyuken, Osaka (JP); Yoshitaka Yamanaka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 931 days.

(21) Appl. No.: 10/463,600

(22) Filed: Jun. 18, 2003

(65) Prior Publication Data
US 2004/0021880 A1 Feb. 5, 2004

(30) Foreign Application Priority Data
Jun. 25, 2002 (JP) ............................. 2002-185257

(51) Int. Cl.
H04N 1/409 (2006.01)
(52) U.S. Cl. .................. 358/3.26; 358/1.14; 399/2
(58) Field of Classification Search ............... 358/409, 358/296, 1.1–1.9, 1.11–1.19, 486, 497, 3.26; 399/2
See application file for complete search history.

(56) References Cited

U.S. PATENT DOCUMENTS 5,032,922 A * 7/1991 Stemmle .................. 358/296
5,402,208 A * 3/1995 Ohmura et al. ................. 399/2
6,876,460 B2 * 4/2005 Torigoe ..................... 358/1.14

FOREIGN PATENT DOCUMENTS

| JP | 4-354258 A | 12/1992 |
|---|---|---|
| JP | 05-048849 | 2/1993 |
| JP | 2000-280555 | 10/2000 |
| JP | 2001-334648 | 12/2001 |
| JP | 2002-049281 A | 2/2002 |

* cited by examiner

Primary Examiner—King Y. Poon
Assistant Examiner—Lennin R Rodriguez
(74) Attorney, Agent, or Firm—Birch, Stewart, Kolasch & Birch, LLP (57) ABSTRACT

A printer is provided with a scanner mounted to a printer main body includes control for suppressing the scanning speed of the carriage during a reading operation of a document image by a scanner. With this structure, the printer can perform an image forming operation at maximum speed and the time required for forming an image can be reduced while suppressing a reading inferior resulting from the vibrations generated from the carriage by suppressing such vibrations.

11 Claims, 9 Drawing Sheets

IMAGE FORMING APPARATUS

This nonprovisional application claims priority under 35 U.S.C. § 119(a) on Patent Application No(s). 2002-185257 filed in JAPAN on Jun. 25, 2002, which is(are) herein incorporated by reference.

FIELD OF THE INVENTION

The present invention relates to a copying machine or other image forming apparatus provided with an image reading unit.

BACKGROUND OF THE INVENTION

In recent years, in the field of ink jet printer as an image forming apparatus, a complex copying machine, which serves not only as a printer but also as a copying machine and a facsimile communication equipment, has been developed by adding an image reading unit (scanner section) and a modem.

However, such complex copying machine presents a problem that vibrations occur when scanning by the ink carriage in a printer section, which in turn causes blur in the reading operation by the scanner section. As to the conventional copying machine of the electrophotographic printing system wherein an image reading operation and an image forming operation are performed, since a photoreceptor drum or various types of rollers rotate at fixed speed, the adverse effects of the foregoing vibrations are less likely to occur.

In response, Japanese Unexamined Patent Publication No. 2001-334648 (published on Dec. 4, 2001) and Japanese Unexamined Patent Publication No. 5-48849/1993 (published on Feb. 26, 1993) disclose typical solution to the foregoing problem. Namely, these publications disclose the technique of suppressing blur by arranging so as to start the scanning operation of the printer section after temporality stopping the scanning operation.

However, when adopting the foregoing conventional techniques, the printer section does not perform an operation during the scanning operation by the scanner section, thereby presenting another problem in that relatively a long time is needed for an overall image forming operation.

SUMMARY OF THE INVENTION

It is an object of the present invention to provide an image forming apparatus capable of reducing the time required for forming an image while suppressing a reading inferior resulting from the vibrations generated from the image forming means by suppressing such vibrations.

In order to achieve the above object, the image forming apparatus of the present invention is characterized by including:

image reading means for reading a document image;

recognition means for recognizing a reading operation of the document image by the image reading means; and speed suppression means for suppressing an image forming speed of the image forming means, wherein the speed suppression means controls the image forming speed of the image forming means such that a first image forming speed during the reading operation of the document image is set to be lower than a second image forming speed during a period where the reading operation is not performed.

According to the foregoing structure, during the reading operation of the document image by the image reading means, the image forming speed of the image forming means is suppressed.

According to the foregoing structure, with its application to a copying machine or other image forming apparatus wherein a reading of a document image is performed in an image forming process, an image forming operation can be performed at maximum speed and the time required for forming an image can be reduced while suppressing a reading inferior resulting from the vibrations generated from the image forming means by suppressing such vibrations.

It is preferable that the image forming apparatus of the present invention further include:

mode selection means which permits a mode selection from a plurality of image forming modes in relation to the image forming means, wherein the speed suppression means changes the suppression of the image forming speed of the image forming means according to the image forming mode as selected by the mode selection means.

According to the foregoing arrangement, a selection can be made from a plurality of image forming modes, and the acceleration/deceleration is adjusted according to the selected mode. Specifically, when the high quality image mode is selected, the acceleration/deceleration of the carriage is further reduced to more effectively suppress the adverse effects of vibrations; on the other hand, when the high speed mode is selected, the acceleration/deceleration of the carriage is set as large as possible within the acceptable range of vibrations.

In this way, appropriate process conditions can be selected according to the user's need.

It is preferable that the image forming means forms an image by carrying out a scanning operation by a carriage.

It is also preferable that the speed suppression means controls the acceleration/deceleration in such a manner that a first acceleration/deceleration of the carriage during a reading operation of the document image is set to be smaller than a second acceleration/deceleration during a period where a reading operation is not performed.

It is further preferable that the acceleration/deceleration area control means controls an acceleration/deceleration area of the carriage in such a manner that the acceleration/deceleration area of the carriage during the reading operation of the document is set to be larger than an acceleration/deceleration area of the carriage during the period where the reading operation is not performed.

It is also preferable that the speed suppression means controls the acceleration/deceleration of the carriage in the acceleration/deceleration area such that an acceleration/deceleration during the reading operation of the document and an acceleration/deceleration during the period where the reading operation is not performed are substantially the same.

According to the foregoing structure which corresponds to the maximum sheet width, during the reading operation of the document image by the image reading means, the speed suppression means increases the area the carriage moves and the accelerating area and the decelerating area with respect to the fixed print area. In this way, the scanning speed of the carriage in the print area can be maintained constant irrespectively of a reduction in acceleration/deceleration of the carriage to suppress the effect of vibrations on the image reading means.

Therefore, although the time required for scanning the accelerating area and the decelerating area is increased, a reduction in speed in the print area which is by far larger than the accelerating area or the decelerating area can be avoided. As a result, an overall time required for printing can be reduced.

For a fuller understanding of the nature and advantages of the invention, reference should be made to the ensuing detailed description taken in conjunction with the accompanying drawings.

DESCRIPTION OF THE EMBODIMENTS

First Embodiment

The following descriptions will explain one embodiment of the present invention in reference to FIGS. 1 to 8.

Figure 1:
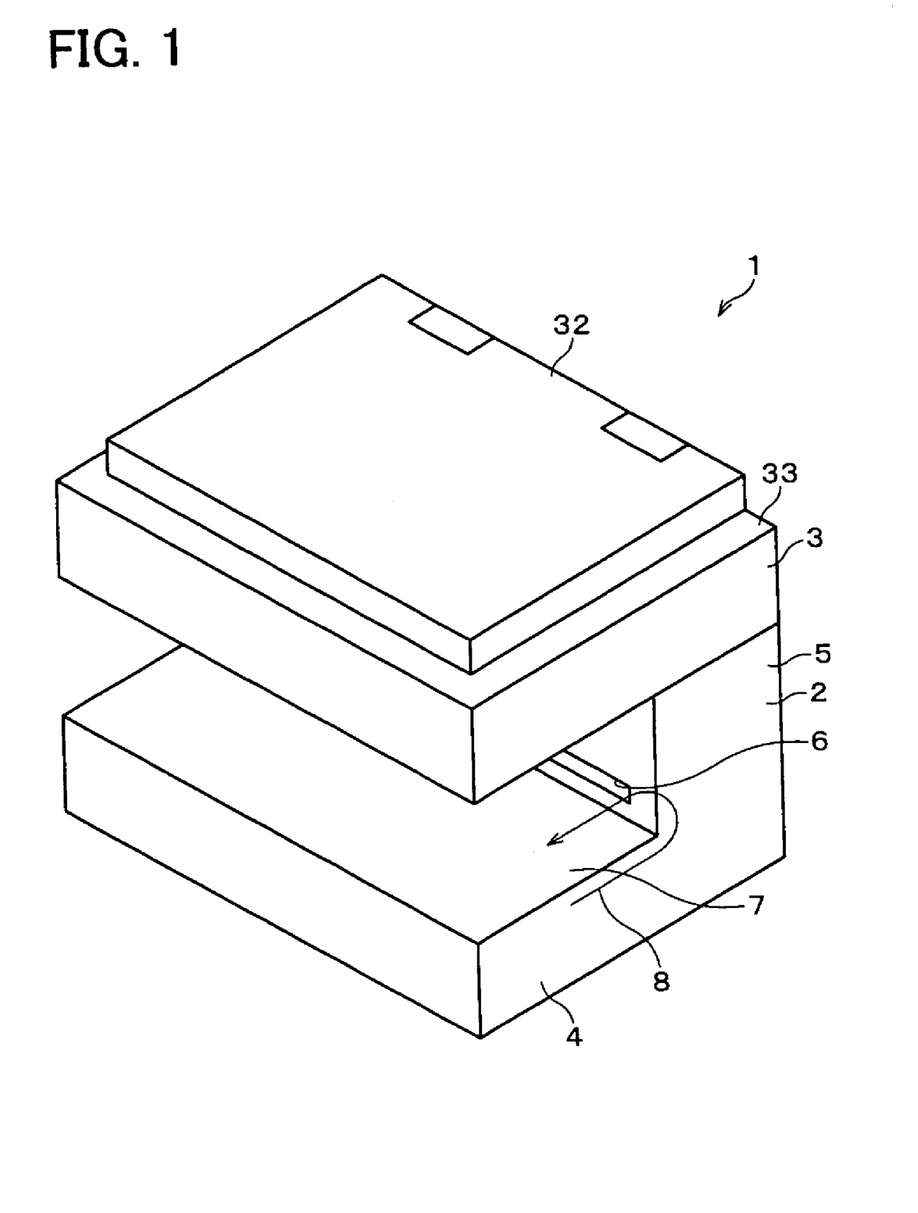
FIG. 1 is a perspective view illustrating the schematic structure of a complex-type ink jet printer as one example of an image forming apparatus in accordance with one embodiment of the present invention.

FIG. 1 is a perspective view illustrating the schematic structure of a complex-type ink jet printer 1 as an image forming apparatus in accordance with one embodiment of the present invention. This complex-type ink jet printer 1 mainly includes a printer main body 2 for recording an image on a sheet by the ink-jet system, and a scanner 3, with platen glass 33 and document cover 32, mounted on the printer main body 2. In the printer main body 2, sheets stored in a sheet storage section 4 are fed one by one to be subjected to a print process in a print section 5, and the sheets having gone through the print process in the print section 5 are then discharged through a sheet discharge opening 6 onto a discharge tray 7. In FIG. 1, the sheets are transported in the printer main body 2 in a direction of an arrow 8.

Figure 2:
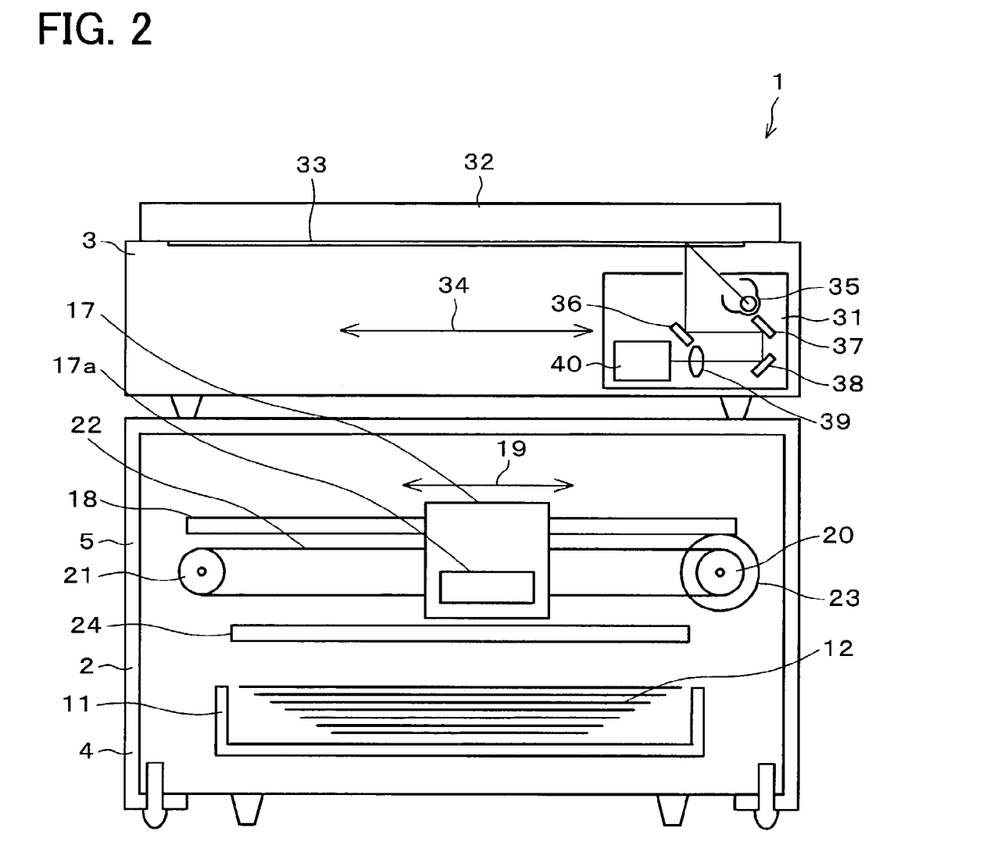
FIG. 2 is a cross-sectional view of the printer of FIG. 1 when seen from the right hand side.
Figure 3:
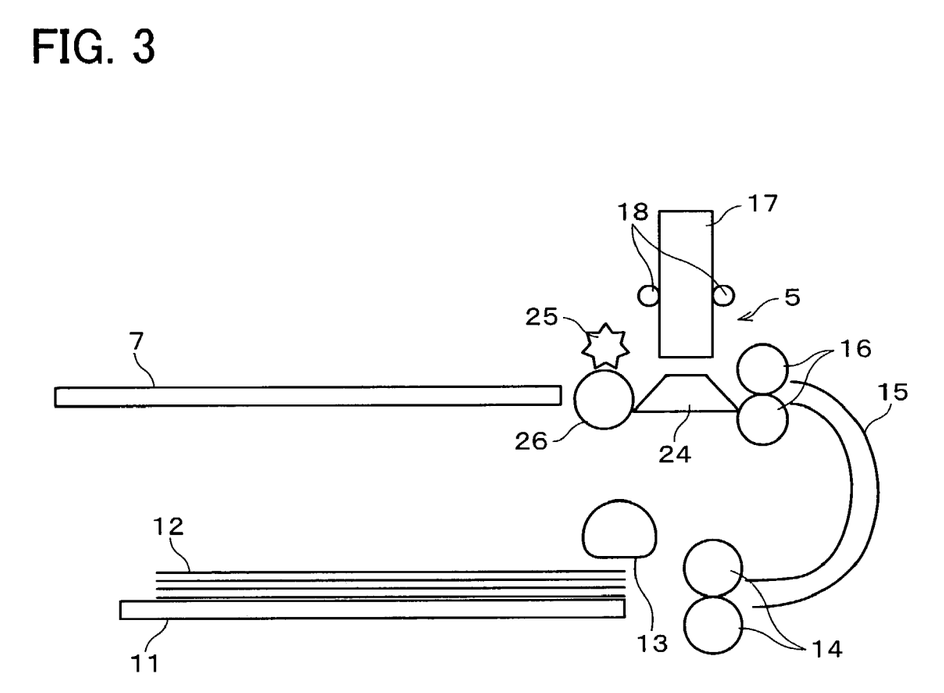
FIG. 3 is a cross-sectional view of a print section of the printer of FIG. 1 when seen from the front face.

FIG. 2 is a cross-sectional view of the printer 1 when seen from the right hand side. FIG. 3 is a cross-sectional view of the print section 5 when seen from the front face. The sheets 12 stacked in the sheet cassette 11 in the sheet storage section 4 are fed one by one by a pick-up roller 13 to be transported to the printer section 5 via a pair of feed rollers 14 and a U-shaped sheet transport path 15. Further, a pair of PS rollers 16 is provided right before the print section 5 in the sheet transport direction. After carrying out the tilt adjustment and the timing adjustment by the pair of PS rollers 16, the print operation is performed by a print head 17a in a carriage 17 of the print section 5. This carriage 17 is supported by a guide shaft 18 extending in the depth of the printer main body 2 so as to be freely movable in a main scanning direction 19. A timing belt 22 belted between a pair of pulleys 20 and 21 is fixed to the carriage 17 at one point. On the other hand, the carriage 17 is moved by driving the pulley 20 by a motor 23. In the print section 5, a platen 24 which supports the sheets 12 from the back surface is provided so as to face the print head 17 which moves in the main scanning direction 19. After having gone through the print process, the sheet 12 as sandwiched between a star roller 25 and a discharge roller 26 is discharged onto a discharge tray 7.

On the other hand, the scanner 3 includes an optical unit 31, a document cover 32 and a platen glass 33, and a document image on the platen glass 33 is read sequentially as the optical unit 31 moves in a sub scanning direction 34. The optical unit 31 mainly includes a light source 35, a first mirror 36, a second mirror 37, a third mirror 38, an imaging lens 39 and a CCD unit 40. As in the case of the carriage 17, the optical unit 31 is supported by a guide shaft (not shown) in the sub scanning direction 34 so as to be freely movable, and is driven by a timing belt, etc.

Figure 4:
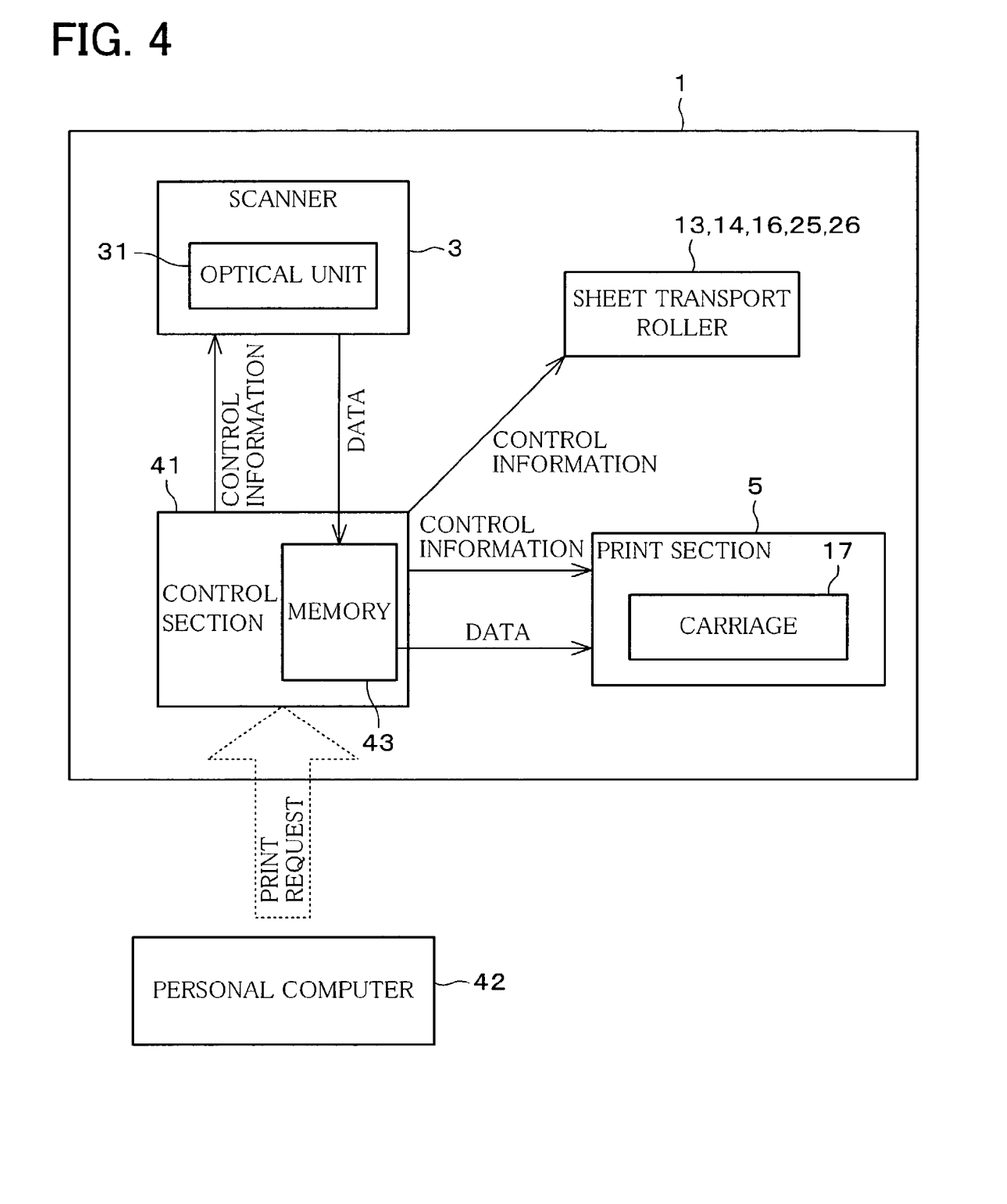
FIG. 4 is a block diagram illustrating the electric structure of the printer of FIG. 1.

FIG. 4 is a block diagram illustrating the electric structure of the printer 1 having the foregoing structure. A control section 41 with a CPU (central processing unit) is provided for controlling the print section 5 and the rollers 13, 14, 16, 25 and 26 for transporting the sheets. This control section 41 also controls the scanner 3. In response to a print request given from a personal computer 42 (host computer), the control section 41 first outputs control information to the scanner 3. In response to the control information, the scanner 3 executes an image reading operation. After the scanner 3 starts the scanning operation, the image data as read by a CCD unit of the optical unit 31 is temporarily stored in memory 43 provided in the control section 41. Thereafter, the image data is processed into the print data, and upon preparing the print data for one line, the control information and the data are transported to the print section 5. Based on these information, the carriage 17 starts the scanning operation.

The characteristic features of the present invention lie in that the control section 41 observes the operation of the scanner 3, and the scanning speed of the carriage 17 is suppressed during the reading operation by the scanner 3 so as to suppress a reading error of the scanner 3 due to vibrations of the carriage 17. Further, in the personal computer 42, a mode selection can be made between the high image quality mode (image quality preferred mode) and the high speed mode (speed preferred mode), and the scanning speed is more suppressed in the high quality image mode than the high speed mode.

Figure 5:
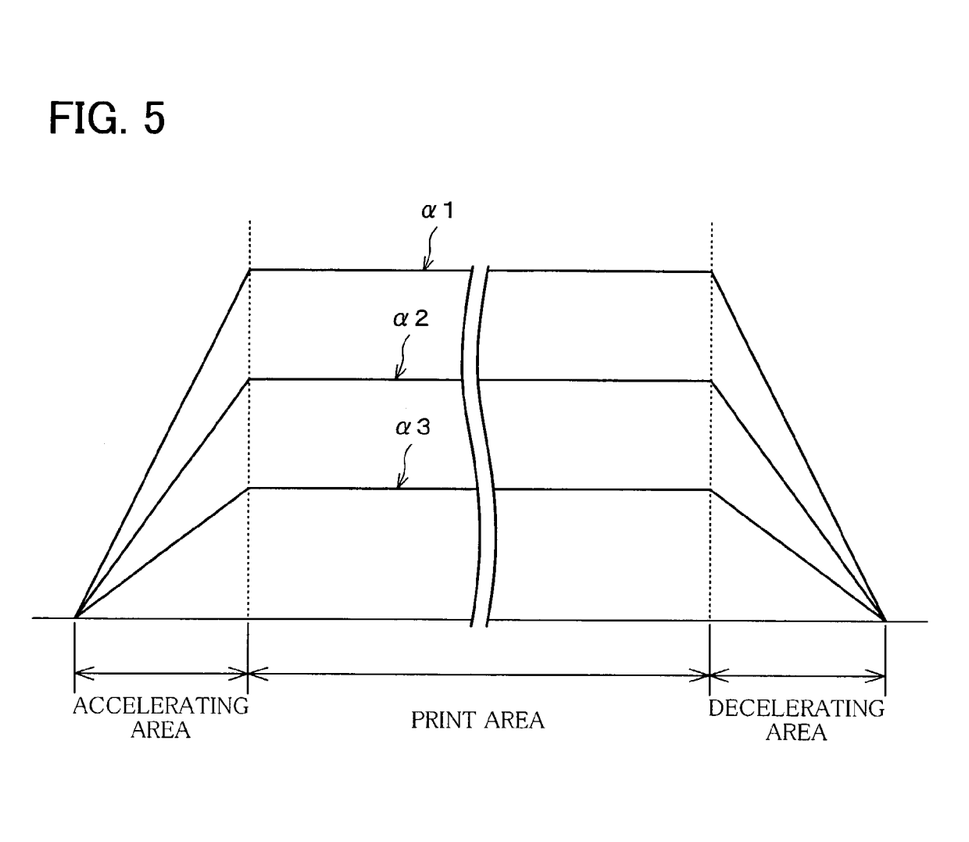
FIG. 5 is a graph explaining the differences in scanning speed of the carriage in accordance with one embodiment of the present invention.

FIG. 5 is a graph which explains the differences in scanning speed of the carriage 17. The scanning area of the carriage 17 can be roughly divided into an accelerating area, a print area and a decelerating area. The scanning area also includes the areas corresponding to the home position of the carriage 17 when the carriage 17 is not involved in the print process and the maintenance position when the cleaning of a nozzle is performed, or the nozzle is capped for preventing the ink from being volatilized. In FIG. 5, only the main three areas related to the print process are shown. Further, since the print head 17a performs a print operation in the approach path and the back path of the carriage 17, and the accelerating area and the decelerating area are interchanged between the two scanning directions of the carriage 17.

In FIG. 5, the reference numeral α1 indicates a normal print speed, and both the acceleration in the accelerating area and the deceleration in the decelerating area are 1.5 G. Therefore, in the predetermined accelerating area, the carriage 17 accelerates up to 40 ips, and in the print area, a scanning operation is performed at a fixed speed of 40 ips. On the other hand, the reference numerals α2 and α3 indicate the decelerated print speeds during the reading operation of the scanner 3. The reference numeral α2 indicates the print speed in the high speed mode (speed preferred mode), and both the acceleration and the deceleration are 1.1 G. Therefore, in the print area, a scanning operation is performed at 30 ips. The reference numeral α3 indicates the print speed in the high image quality mode (image quality preferred mode), and both the acceleration and the deceleration are 0.75 G. Therefore, in the print area, a scanning operation is performed at 20 ips.

The following table 1 shows the relationship between the acceleration, the deceleration, the ultimate speed of the carriage 17, and the quality of the image ready by the scanner 3. As explained, the greater is the acceleration or the deceleration, the higher is the ultimate speed and the shorter is the time required for printing; on the other hand, the more obvious is the image blur, the deterioration of the image quality.

TABLE 1

| ACCELERATION/ DECELERATION (G) | ULTIMATE CARRIAGE SPEED (ips) | READ IMAGE |
|---|---|---|
| 1.5 | 40 | X (greatly blurred) |
| 1.1 | 30 | Δ (slightly blurred) |
| 0.75 | 20 | ◯ (no blur) |

FIGS. 6(a) through 6(d) show examples of the print speed in the high quality image mode. FIG. 6(a) indicates the scanning by the scanner, FIG. 6(b) indicates the transfer of the data from the CCD unit 40 of the scanner 3 to the memory 43 of the control section 41, FIG. 6(c) indicates the transfer of the data of the memory 43 with the control information to the print head 17a of the print section 5, and FIG. 6(d) indicates the scanning by the carriage 17.

At t1, the optical unit 31 of the scanner 3 starts a scanning operation to start reading a document image. From t2, the optical unit 31 performs a scanning operation at a fixed speed, and from t3, the obtained image data starts being transferred from the CCD unit 40 to the memory 43.

The image data are then further subjected to a variety of image processes, and after preparing the control data to be added, the image data starts being transferred to the print head 17a from t4, and the carriage 17 starts accelerating at 0.75 G (minimum acceleration) indicated by the reference numeral α3 in FIG. 5 and reaches the speed of 20 ips at the end of the accelerating area, at t5. The carriage 17 then performs the print process at the fixed speed of 20 ips. At the end of the print area at t6, the carriage 17 starts decelerating at 0.75 G, and finishes scanning the decelerating area at t7.

From t7, the carriage 17 starts scanning in a verse direction. From t7, the carriage 17 starts accelerating again at 0.75 G and from t8, the carriage 17 starts carrying out a print operation at fixed speed. When the carriage 17 finishes scanning the print area at t9, the carriage 17 starts the decelerating at 0.75 G, and finishes scanning the decelerating area at t10. From MO, the carriage 17 starts scanning in the reverse direction again.

Thereafter, when the scanner 3 finishes reading an image at t1, the optical unit 31 starts decelerating and reaches the end of the scanning area at t12. The scanner 3 then starts scanning again in the reverse direction, and is back to the home position at t13.

Figure 6:
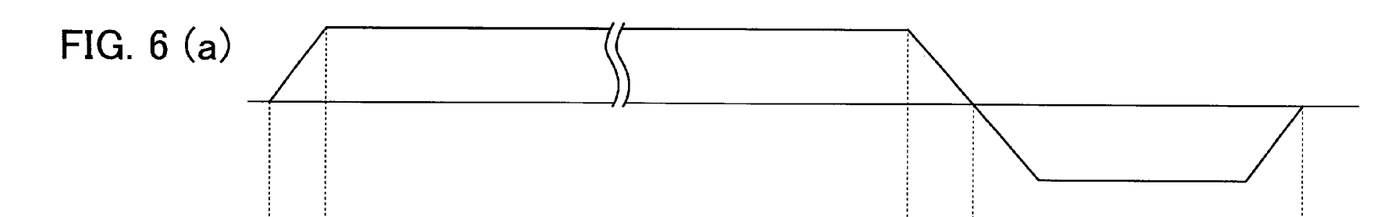
FIGS. 6(a) through 6(d) are graphs which explain how a print speed changes in a image quality preferred mode as an example
Figure 7:
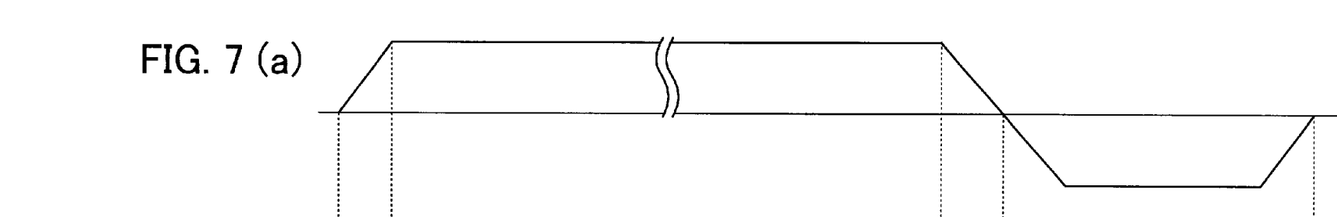
FIGS. 7(a) through 7(d) are graphs which explain how a print speed changes in a speed preferred mode as an example.

From the first accelerating/decelerating period after the scanner 3 finishes reading an image by the scanner 3 at t11 (deceleration start timing at t14 in FIG. 6), the acceleration/deceleration of the carriage 17 is changed to the maximum indicated by α1 in FIG. 5. The carriage 17 then performs a print operation at fixed speed 40 ips in the print periods of from t15 to t16 and from t17 to t18.

FIGS. 7(a) through 7(d) are graphs which explain how the print speed changes in the high speed mode (speed preferred mode) as one example. FIGS. 7(a) through 7(d) correspond to FIG. 6(a) to 6(d), and t1 to t18 in FIGS. 7(a) through 7(d) correspond to t1 to t18 in FIGS. 6(a) through 6(d). The scanning operation by the scanner 3 in 7(a) and the data transfer from the CCD unit 40 to the memory 43 in 7(b) are the same as those in FIGS. 6(a) and 6(b).

In the example shown in FIGS. 7(a) through 7(d), during the reading operation by the scanner 3, i.e., in the period from t1 to t11, the carriage 17 accelerates in the periods of from t4 to t5 and from t7 to t8, and decelerates in the periods of from t6 to t7 and from t9 to t10 at 1.1 G as indicated by α2 in FIG. 5. Therefore, in the print area, i.e., in the period of from t5 to t6 and the period of from t8 to t9, the carriage 17 performs a print operation at a fixed speed of 30 ips. After the scanner 3 finishes the reading operation from t11, the acceleration and the deceleration of the carriage 17 are changed back to the maximum 1.5 G, and the carriage 17 performs a print operation at a fixed speed of 40 ips.

Figure 8:
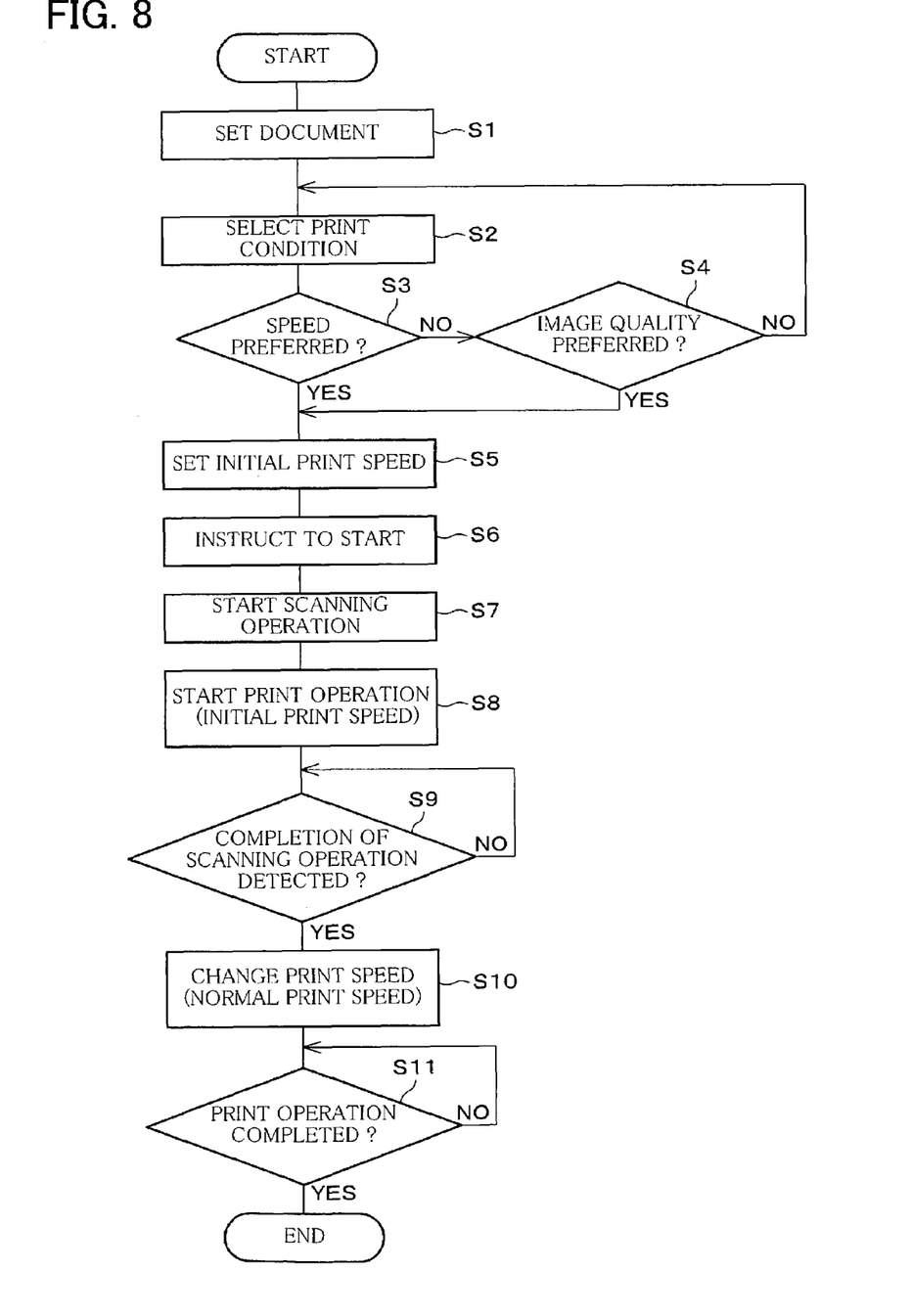
FIG. 8 is a flowchart which explains the operations of switching the print speed of FIGS. 6(a) to 6(d) and 7(a) to 7(b).

FIG. 8 is a flowchart which explains how the print speed changes. S1, a document is set on the platen glass 33. In S2, the print condition is selected. Then, in S3 and S4, it is determined whether the high speed mode (speed preferred mode) or the high image quality mode (image quality preferred mode) is selected. If it is determined that neither of the modes is selected, i.e., the print condition has not been input, the sequence goes back to S2, and the print condition is input. After the determination is made on the selected mode, the sequence then moves on to S5.

In S5, the initial print speed (20 ips or 30 ips) and the acceleration/deceleration (0.75 or 1.1 G) are determined based on the mode determined in S3 and S4. In S6, upon inputting an instruction to start the print operation from the personal computer 42, the scanner 3 starts a scanning operation from S7. Then, in response to the print data input in the print head 17a, from S8, the carriage 17 starts a scanning operation at the speed determined in S5 to start the print operation.

In S9, it is waited until the reading operation by the scanner 3 is completed, and the scanner completes the scanning operation by the scanner 3. The sequence then goes to S10. In S10, the scanning speed of the carriage 17 is changed to the maximum (40 ips), and the acceleration/deceleration is also changed to the maximum (1.5 G). In S11, it is waited until the print operation is completed, and the process is terminated when the print operation is completed.

As described, the printer 1 of the present invention including the scanner 3 mounted to the printer main body 2 is arranged such that upon detecting that the scanner 3 is reading the document image, the control section 41 suppresses the scanning speed of the carriage 17, so as to suppress vibrations generated from the carriage 17. As a result, an image forming operation can be performed at maximum speed and the time required for forming an image can be reduced while suppressing a reading inferior resulting from the vibrations generated from the image forming means by suppressing such vibrations.

The printer main body 2 is arranged such that the carriage 17 reciprocates in the main scanning directions 19, and the sheet 12 is transported in the sub scanning direction to form an image. Therefore, in the application of the present invention to the foregoing structure which generates large vibrations due to reciprocate movements of the carriage 17, the beneficial features of the present invention are more appreciated as compared to the case of applying the present invention to the structure wherein the nozzles and the light-emitting elements are arranged in the main scanning direction like a line head, and an image forming operation is performed only by transporting the sheet in the sub scanning direction.

Further, it is arranged such that a selection can be made from a plurality of image forming modes from the personal computer 42, and the acceleration/deceleration is adjusted according to the selected mode. Specifically, when the high quality image mode is selected, the acceleration/deceleration of the carriage 17 is further reduced to more effectively suppress the adverse effects of vibrations; on the other hand, when the high speed mode is selected, the acceleration/deceleration of the carriage 17 is set as large as possible within the acceptable range of vibrations. In this way, appropriate print conditions can be selected according to the user's need.

Second Embodiment

Figure 9:
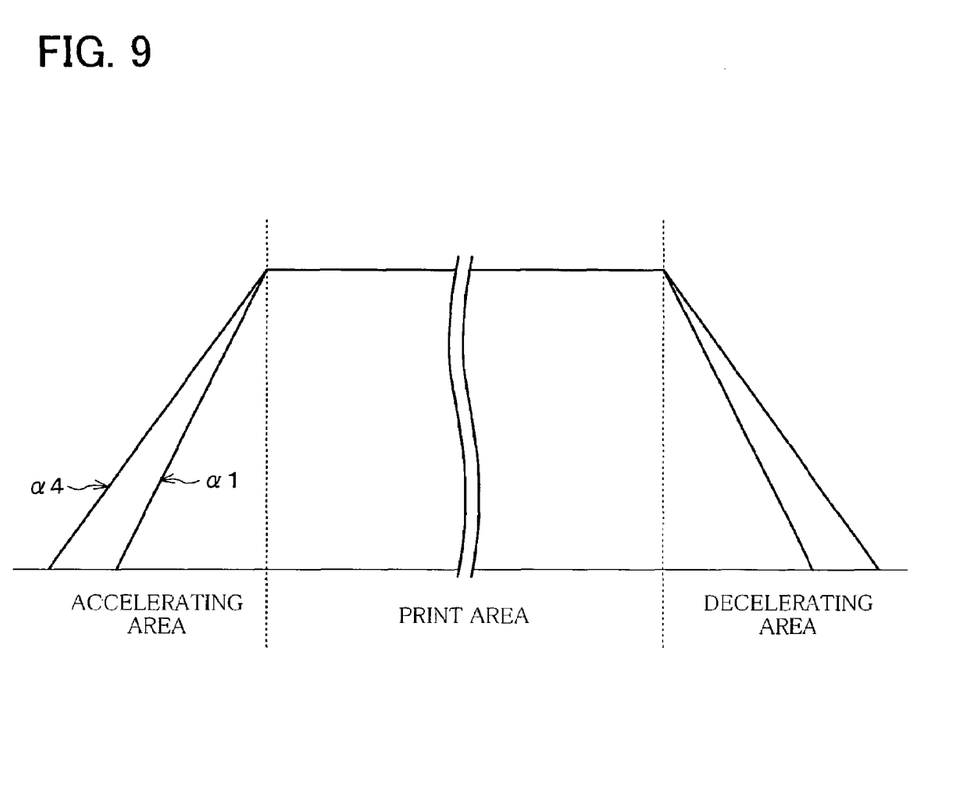
FIG. 9 is a graph which explains differences in scanning speed of the carriage in accordance with another embodiment of the present invention.

The following descriptions will explain another embodiment of the present invention in reference to FIG. 9.

FIG. 9 is a graph which explains the differences in the scanning speed of the carriage in the complex-type ink jet printer which serves as an image forming apparatus in accordance with another embodiment of the present invention. FIG. 9 corresponds to FIG. 5. The characteristic feature of the scanning method of the present embodiment, which corresponds to the maximum sheet width, lies in that with respect to a fixed print area, the accelerating area and the decelerating area can be changed. With this scanning method, the scanning speed in the print area can be set to the maximum (40 ips) in even during the reading operation of the scanner 3 by increasing the accelerating area and the decelerating area. Namely, even when the acceleration and the deceleration are reduced to be 1.1 G during the scanning operation of the scanner 3, as indicated by the reference numeral $\alpha 4$, from the acceleration and the deceleration in the normal state, i.e., 1.5 G as indicated by $\alpha 1$, the scanning speed can be reached to 40 ips.

Therefore, although a longer time is required for scanning the accelerating area and the decelerating area as compared to the case of FIG. 5, a reduction in scanning speed in the print area which is by far larger than the accelerating area and the decelerating area can be avoided, thereby reducing an overall time required for the print time. Incidentally, the vibrations to be transferred to the scanner 3 are mostly generated when accelerating/decelerating, and vibrations are less likely to be generated during the scanning operation in the print area at fixed high speed.

As described, the image forming apparatus of the present invention, such as a copying machine, etc., provided with the image reading means mounted to the image forming means is arranged such that during the reading operation of the document image by the image reading means, the image forming speed of the image forming means is suppressed.

According to this structure, with its application to a copying machine or other image forming apparatus wherein a reading of a document image is performed in an image forming process, an image forming operation can be performed at maximum speed and the time required for forming an image can be reduced while suppressing a reading inferior resulting from the vibrations generated from the image forming means by suppressing such vibrations.

The foregoing image forming apparatus may be further arranged such that a selection can be made from a plurality of image forming modes, and the acceleration/deceleration is adjusted according to the selected mode. Specifically, when the high quality image mode is selected, the acceleration/deceleration of the carriage is further reduced to more effectively suppress the adverse effects of vibrations; on the other hand, when the high speed mode is selected, the acceleration/deceleration of the carriage is set as large as possible within the acceptable range of vibrations.

In this way, appropriate process conditions can be selected according to the user's need.

The foregoing image forming apparatus may be further arranged such that the image forming means forms an image by carrying out a scanning operation by a carriage.

Therefore, in the application of the present invention to the foregoing structure which generates large vibrations due to reciprocate movements of the carriage, the beneficial features of the present invention are more appreciated as compared to the case of applying the present invention to the structure wherein the nozzles and the light-emitting elements are arranged in the main scanning direction like a line head, and an image forming operation is performed only by transporting the sheet in the sub scanning direction.

The image forming apparatus of the present invention may be arranged such that the acceleration/deceleration of the carriage is reduced and the area where the carriage moves during the reading operation of the document image is increased, and the scanning speed of the carriage in the print area is maintained constant irrespectively of a reduction in the acceleration/deceleration of the carriage.

With this structure, the scanning speed of the carriage in the print area can be maintained constant irrespectively of a reduction in acceleration/deceleration of the carriage to suppress the effect of vibrations on the image reading means. Therefore, although the time required for scanning the accelerating area and the decelerating area is increased, a reduction in speed in the print area, which is by far larger than the accelerating area and the decelerating area, can be avoided. As a result, an overall time required for printing can be reduced.

The image forming apparatus of the present invention provided with the image forming means and the image reading means is characterized by including: detection means for detecting a reading period of a document image by the image reading means; and speed suppression means for suppressing an image forming speed of the image forming means, wherein the speed suppression means suppresses the image forming speed of the image forming means during the reading operation of the document image based on the detection by the detection means.

According to the foregoing structure, in the image forming apparatus including the image reading means mounted to the image forming means, during the reading operation of the document image by the image reading means such as a scanner as detected by the detection means, the speed suppression means suppresses the image forming speed of the image forming means such as an ink jet printer, etc. Specifically, for example, during the scanning operation of the optical system for scanning of the scanner, the acceleration/deceleration at a rise/fall of the carriage of the ink jet printer is suppressed. When the reading operation is detected to be completed, the suppression is cancelled, and the acceleration/deceleration is set back to that in the normal state.

According to the foregoing structure, with its application to a copying machine or other image forming apparatus wherein a reading of a document image is performed in an image forming process, an image forming operation can be performed at maximum speed and the time required for forming an image can be reduced while suppressing a reading inferior resulting from the vibrations generated from the image forming means by suppressing such vibrations.

It is preferable that the image forming apparatus of the present invention further include: mode selection means which permits a mode selection from a plurality of image forming modes in relation to the image forming means, wherein the speed suppression means changes the suppression of the image forming speed of the image forming means according to the image forming mode as selected by the mode selection means.

According to the foregoing arrangement, a selection can be made from a plurality of image forming modes, and the acceleration/deceleration is adjusted according to the selected mode. Specifically, when the high quality image mode is selected, the acceleration/deceleration of the carriage is further reduced to more effectively suppress the adverse effects of vibrations; on the other hand, when the high speed mode is selected, the acceleration/deceleration of the carriage is set as large as possible within the acceptable range of vibrations.

In this way, appropriate process conditions can be selected according to the user's need.

It is preferable that the image forming means forms an image by carrying out a scanning operation by a carriage.

Therefore, in the application of the present invention to the foregoing structure which generates large vibrations due to reciprocate movements of the carriage, the beneficial features of the present invention are more appreciated as compared to the case of applying the present invention to the structure wherein the nozzles and the light-emitting elements are arranged in the main scanning direction like a line head, and an image forming operation is performed only by transporting the sheet in the sub scanning direction.

The image forming apparatus of the present invention may be arranged such that the acceleration/deceleration of the carriage is reduced and the area where the carriage moves during the reading operation of the document image is increased, and the scanning speed of the carriage in the print area is maintained constant irrespectively of a reduction in the acceleration/deceleration of the carriage.

According to the foregoing structure corresponding to the maximum sheet width, during the reading operation of the document image by the image reading means, the speed suppression means increases the area the carriage moves and the accelerating area and the decelerating area with respect to the fixed print area. With this structure, the scanning speed of the carriage in the print area can be maintained constant irrespectively of a reduction in acceleration/deceleration of the carriage to suppress the effect of vibrations on the image reading means.

Therefore, although the time required for scanning the accelerating area and the decelerating area is increased, a reduction in speed in the print area which is by far larger than the accelerating area and the decelerating area can be avoided. As a result, an overall time required for printing can be reduced.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus, comprising:
   image forming means;
   image reading means for reading a document image;
   recognition means for recognizing a reading operation of the document image by said image reading means; and
   speed suppression means for suppressing an image forming speed of said image forming means,
      wherein said speed suppression means controls the image forming speed of said image forming means such that a first image forming speed during the reading operation of the document image is set to be lower than a second image forming speed during a period where the reading operation is not performed.

2. The image forming apparatus as set forth in claim 1, further comprising:
   mode selection means which permits a mode selection from a plurality of image forming modes in relation to said image forming means,
      wherein said speed suppression means changes a degree of suppression of the image forming speed of the image forming means according to an image forming mode as selected by said mode selection means.

3. The image forming apparatus as set forth in claim 2, wherein:
   when a speed preferred mode is selected by said mode selection means, said speed control means set the image forming speed to be higher than the image forming speed set when an image quality preferred mode is selected.

4. The image forming apparatus as set forth in claim 1, wherein:
   said image forming means forms an image by carrying out a scanning operation by a carriage.

5. The image forming apparatus as set forth in claim 4, wherein: said speed suppression means controls an acceleration of the scanning by the carriage.

6. The image forming apparatus as set forth in claim 4, wherein: said speed suppression means controls a deceleration of the scanning by the carriage.

7. An image forming apparatus, comprising:
   image forming means;
   image reading means for reading a document image;
   recognition means for recognizing a reading operation of the document image by said image reading means; and
   speed suppression means for suppressing an image forming speed of said image forming means during a reading operation of the document image by said image reading means based on a recognition by said recognition means,
      wherein said image forming means forms an image by carrying out a scanning operation by a carriage, and
      wherein said speed suppression means controls acceleration/deceleration in such a manner that a first acceleration/deceleration of said carriage during the reading operation of the document image is to be smaller than a second acceleration/deceleration during a period where the reading operation is not performed.

8. The image forming apparatus as set forth in claim 7, further comprising:

acceleration/deceleration area control means which controls acceleration/deceleration areas of the carriage such that an acceleration/deceleration area of the carriage during the reading operation of the document is set to be larger than an acceleration/deceleration area of the carriage during the period where the reading operation is not performed.

9. The image forming apparatus as set forth in claim 8, wherein:

said speed suppression means controls acceleration/deceleration of the carriage in an acceleration/deceleration area such that an acceleration/deceleration during the reading operation of the document and an acceleration/deceleration during the period where the reading operation is not performed are the same.

10. An image forming apparatus, comprising:

image forming means;

image reading means for reading a document image;

recognition means for recognizing a reading operation of the document image by said image reading means; and speed suppression means for suppressing an image forming speed of said image forming means during a reading operation of the document image by said image reading means based on a recognition by said recognition means, wherein said image forming means forms an image by carrying out a scanning operation by a carriage, and wherein said carriage performs a bi-directional scanning operation, and wherein said scanning area of the carriage includes an accelerating area, a print area in which said carriage performs a scanning operation at fixed speed, and a decelerating area, and wherein an acceleration of the scanning speed of said carriage in the acceleration area is identical with a deceleration in the deceleration area, and the acceleration area and the deceleration area are interchanged between a forward scanning and a backward scanning.

11. An image forming apparatus, comprising:

image forming means;

image reading means for reading a document image;

recognition means for recognizing a reading operation of the document image by said image reading means; and speed suppression means for suppressing an image forming speed of said image forming means during a reading operation of the document image by said image reading means based on a recognition by said recognition means, wherein said image forming means forms an image by carrying out a scanning operation by a carriage, and wherein said speed suppression means reduces acceleration/deceleration of the carriage and increases a print area where the carriage moves during the reading operation of the document image based on the recognition by said recognition means, and wherein a scanning speed of the carriage in the print area is maintained constant irrespective of a reduction in the acceleration/deceleration of the carriage.

* * * * *